(12) United States Patent
They (10) Patent No.: US 11,511,832 B2
(45) Date of Patent: *Nov. 29, 2022

(54) AMPHIBIOUS AIRCRAFT TAXIING AND DOCKING SYSTEMS

(71) Applicant: They, Galveston, TX (US)

(72) Inventor: They, Galveston, TX (US)

(*) Notice: Subject to any disclaimer, the term of this patent is extended or adjusted under 35 U.S.C. 154(b) by 383 days.

This patent is subject to a terminal disclaimer.

(21) Appl. No.: 16/781,494

(22) Filed: Feb. 4, 2020

(65) Prior Publication Data

US 2021/0237834 A1 Aug. 5, 2021

(51) Int. Cl.
| | | |
|---|---|---|
| *B63B 35/68* | (2006.01) | |
| *B64C 35/00* | (2006.01) | |
| *B63H 21/17* | (2006.01) | |
| *B63H 25/02* | (2006.01) | |
| *B63H 23/02* | (2006.01) | |
| *B64F 1/12* | (2006.01) | |

(52) U.S. Cl.
CPC ............ *B63B 35/68* (2013.01); *B63H 21/17* (2013.01); *B63H 23/02* (2013.01); *B63H 25/02* (2013.01); *B64C 35/001* (2013.01); *B64C 35/008* (2013.01); *B64F 1/12* (2013.01); *B63H 2025/028* (2013.01)

(58) Field of Classification Search
CPC ........ B63B 35/68; B63H 21/17; B63H 23/02; B63H 25/02; B63H 2025/028; B64C 35/001; B64C 35/008; B64F 1/12
See application file for complete search history.

(56) References Cited

U.S. PATENT DOCUMENTS

| | | | | |
|---|---|---|---|---|
| 2,381,394 A | * | 8/1945 | Beach, Jr. ............... | B63B 22/02 114/230.1 |
| 3,266,068 A | * | 8/1966 | High ...................... | B63B 22/00 114/294 |
| 5,595,133 A | * | 1/1997 | Bullard ................... | B63C 11/49 114/66 |
| 2018/0244383 A1 | * | 8/2018 | Valente ................... | B64C 37/00 |

FOREIGN PATENT DOCUMENTS

WO WO-2018229350 A1 * 12/2018

* cited by examiner

*Primary Examiner* — Stephen P Avila
(74) *Attorney, Agent, or Firm* — Benjamin Aaron Adler (57) ABSTRACT

Provided herein is a taxiing system for steering an amphibious aircraft on a body of water. The system has a pair of thrusters that are deployed after landing on the water to taxi the amphibious the aircraft prior to docking and to unloading and are retractable to taxi the amphibious aircraft prior to take-off. Also provided is a docking device to dock the amphibious aircraft to a mooring buoy. In addition provided herein is a system for maneuvering an amphibious aircraft during taxiing and docking on water that integrates the taxiing system with the docking device.

20 Claims, 11 Drawing Sheets

AMPHIBIOUS AIRCRAFT TAXIING AND DOCKING SYSTEMS

BACKGROUND OF THE INVENTION

Field of the Invention

The present invention is in the field of aircraft control systems. More specifically, the present invention is directed to systems and devices for amphibious aircraft taxiing and docking control.

Description of the Related Art

Amphibious aircrafts have a distinct advantage over land-based planes in availability of landing sites and their ability to operate from remote locations.

However, a basic understanding of fluid dynamics and the interaction of a plane operating in that environment brings to light some very real and hazardous situations that a pilot must acknowledge and overcome. One of the primary and consistently prevalent problems is low-speed taxi maneuvering. A survey (F.A.A. Accident Survey 1992 Doc #1825.23) concluded that over 87% of amphibious accidents occurred while taxiing in close proximity to obstructions such as docks, fueling stations, other planes. Such accidents increase the risk to life and property damage that can cost over three million dollars.

In general, the slower the velocity of an object moving through the water, the less the resistance offered. At slow speeds, even a draft of wind can send the plane moving in an uncontrolled direction with potentially disastrous results. Thus, for a plane moving slowly in taxi, a compromise must be made by moving fast enough to be able to steer the plane, (loss of "steerageway") but not collide with the intended destination. Such precise control is complicated by aircraft design, which makes it difficult to apply existing methods uniformly for all aircraft.

Overall, there is a deficiency in the art for optimal maneuvering systems for amphibious aircraft. Thus, there is a recognized need for improved systems and devices for assisting amphibious aircraft during taxiing and docking. The present invention fulfills this longstanding need and desire in the art.

SUMMARY OF THE INVENTION

The present invention is directed to a taxiing system for steering an amphibious aircraft on a body of water. The device comprises a pair of pods, a control console and a power source. Each of the pair of pods has a proximal end and a distal end and each is mounted on a float on the aircraft. Each pod comprises an enclosure formed within at the proximal end and a cradle formed within at the distal end. A thruster is housed within the cradle and is removably deployable during taxiing. A thruster deployment assembly is housed within the enclosure and is in mechanical communication with the thruster. The control console is in operable communication with the thruster deployment assembly and the power source is in electrical communication with the thruster, the thruster deployment assembly and the control console.

The present invention is directed to a related system further comprising a seal disposed on the pod between a bottom surface thereof and a top surface of the float. The present invention is directed to another related system further comprising at least one electromechanical lock attached to one or both floats on the amphibious aircraft. The electromechanical lock is configured to lock and to unlock with a docking ring. The present invention is directed to yet another related control console further comprising a remote control in wireless communication therewith.

The present invention also is directed to a docking device for remotely docking an amphibious aircraft. The docking device comprises a docking ring disposed on an outer surface of a mooring buoy and a remote control configured to actuate at least one electromagnetic lock attached to the amphibious aircraft to lock and unlock with the docking ring.

The present invention is directed further to a system for maneuvering an amphibious aircraft for taxiing and docking on water. In the system there is a pair of pods each mounted on a float on the amphibious aircraft and each pod comprising a seal disposed between a bottom surface thereof and a top surface of the float. Each pod houses a thruster and a thruster deployment assembly in mechanical communication with the thruster. The thruster deployment assembly is configured to actuate the thruster to taxi the amphibious plane to a mooring buoy. At least one electromechanical lock is attached to one or both floats on the amphibious aircraft. A control console is in operable communication with the thruster deployment assembly. A remote control is in communication with the control console and is configured to actuate the thrusters in a forward or a reverse direction and to actuate the electromagnetic lock to lock and unlock with a docking ring circumferentially disposed around the mooring buoy. The power source is in electrical communication with the thruster, the thruster deployment assembly and the control console.

Other and further aspects, features, benefits, and advantages of the present invention will be apparent from the following description of the presently preferred embodiments of the invention given for the purpose of disclosure.

BRIEF DESCRIPTION OF THE DRAWINGS

So that the matter in which the above-recited features, advantages and objects of the invention, as well as others that will become clear, are attained and can be understood in detail, more particular descriptions of the invention briefly summarized above may be had by reference to certain embodiments thereof that are illustrated in the appended drawings. These drawings form a part of the specification. It is to be noted, however, that the appended drawings illustrate preferred embodiments of the invention and therefore are not to be considered limiting in their scope.

FIGS. 1A-1E show the control console and remote for the amphibious aircraft taxiing and auto-dock mooring system.

FIGS. 2A-2D show a top view of the taxiing system comprising a pod with a thruster mounted on the left float of the amphibious aircraft.

FIGS. 3A-3E show a front view of the taxiing system comprising a pod with a thruster mounted on the left float of the amphibious aircraft.

FIGS. 4A-4D show a side view of the taxiing system comprising a thruster mounted on the left float of the amphibious aircraft.

FIGS. 5A-5B show a top view of the pod showing the retract and deploy drive mechanism for the thruster.

FIGS. 6A-6C show the mounting positions of the taxiing system on the floats of the amphibious aircraft.

FIGS. 7A-7C shows the auto-dock mooring system for securing an amphibious aircraft to a dock.

FIGS. 8A-8B illustrate steering and securing of the aircraft to a buoy and dock using the taxiing system.

DETAILED DESCRIPTION OF THE PRESENT INVENTION

For convenience, before further description of the present invention, certain terms employed in the specification, examples and appended claims are collected herein. These definitions should be read in light of the remainder of the disclosure and understood as by a person of skill in the art. Unless defined otherwise, all technical and scientific terms used herein have the same meaning as commonly understood by a person of ordinary skill in the art.

The articles "a" and "an" when used in conjunction with the term "comprising" in the claims and/or the specification, may refer to "one", but is also consistent with the meaning of "one or more", "at least one", and "one or more than one". Some embodiments of the invention may consist of or consist essentially of one or more elements, components, method steps, and/or methods of the invention. It is contemplated that any composition, component or method described herein can be implemented with respect to any other composition, component or method described herein.

The term "or" in the claims refers to "and/or" unless explicitly indicated to refer to alternatives only or the alternatives are mutually exclusive, although the disclosure supports a definition that refers to only alternatives and "and/or".

The terms "comprise" and "comprising" are used in the inclusive, open sense, meaning that additional elements may be included.

The term "including" is used herein to mean "including, but not limited to". "Including" and "including but not limited to" are used interchangeably.

The term "pod" is used herein to mean, a self-contained unit comprising various structural and functional elements that is installed on an aircraft.

As used herein, the terms "proximal" and "distal" in reference to the taxiing system disclosed herein refer to those components, features, parts and aspects thereof that are nearer or nearest to or farther or farthest from the front or nose of the amphibious aircraft.

As used herein, the term "about" refers to a numeric value, including, for example, whole numbers, fractions, and percentages, whether or not explicitly indicated. The term "about" generally refers to a range of numerical values (e.g., +/−5-10% of the recited value) that one of ordinary skill in the art would consider equivalent to the recited value (e.g., having the same function or result). In some instances, the term "about" may include numerical values that are rounded to the nearest significant figure. For example, a thrust of 22 pounds to 72 pounds is encompassed by about 25 pounds to about 65 pounds.

In one embodiment of the present invention, there is provided a taxiing system for steering an amphibious aircraft on a body of water comprising a pair of pods each having a proximal end and a distal end and each mounted on a float on the amphibious aircraft, each of said pods comprising an enclosure formed within each pod at the proximal end; a cradle formed within each pod at the distal end; a thruster housed within the cradle and removably deployable therefrom during taxiing; a thruster deployment assembly housed within the enclosure and in mechanical communication with the thruster; a control console in operable communication with the thruster deployment assembly; and a power source in electrical communication with the thruster, the thruster deployment assembly and the control console. Further to this embodiment the taxiing system comprises a seal disposed on the pod between a bottom surface thereof and a top surface of the float. In another further embodiment the taxiing system comprises at least one electromechanical lock attached to one or both floats on the amphibious aircraft configured to lock and to unlock with a docking ring.

In all embodiments each thruster may be independently operable. Also in all embodiments the thruster deployment assembly may be configured to independently actuate the thruster in each of the pair of pods in a left direction or in a right direction. In addition the pods may comprise an aerodynamic outer surface. Furthermore each pod may be mounted on the float on an inboard side at a front end thereof.

In an aspect of all embodiments each thruster may comprise a water-proofed first drive motor with a thruster fan operably attached thereto; a thruster housing containing the first drive motor and the thruster fan therein; a deployment arm comprising a first deployment end and a second deployment end, the first deployment end is movably attached to the thruster housing on an upper surface thereof; and a retention arm comprising a first retention end and a second retention end disposed in a parallel relationship with the deployment arm, the first retention end movably attached to an upper surface of the thruster housing. In this aspect the deployment arm and the retention arm may be each articulated in at least two locations thereon. Also in this aspect the first drive motor may be configured to deliver a thrust of about 25 pounds to about 65 pounds.

In another aspect of all embodiments the thruster deployment assembly may comprise a base plate; a water-proof second drive motor attached to the base plate; a relay in electrical communication with the second drive motor; a gear assembly operably attached to the second drive motor; a worm gear drive swivel with a first swivel end and a second swivel end, said first swivel end in an actuating relationship with the gear assembly; a worm gear drive with a first drive end and a second drive end; a worm gear in an actuating relationship with the first drive end; a worm gear follower disposed circumferentially around the worm gear and configured to travel along the worm gear; a deployment arm actuator attached to the worm gear follower and configured to actuate the deployment arm; and a retention arm mount attached to the base plate and in mechanical communication with the second retention end of the retention arm. In this aspect the deployment arm actuator may comprise a threaded adjustment rod with a proximal end and a distal end, the proximal end attached to a top surface of the worm gear follower; a ball mount attached to the distal end of the threaded adjustment rod and to the second deployment end of the deployment arm; and a cam assembly comprising a channel disposed diagonally thereacross, said channel configured to receive the deployment arm therein. Also in this aspect the second drive motor may be configured to deliver a thrust rate from about 25 pounds to about 65 pounds.

In yet another aspect of all embodiments the control console may comprise a mode selector switch to switch the aircraft between flight mode and taxi mode; a pair of joysticks each configured to steer the amphibious aircraft when in taxi mode; a speed sensor configured to monitor speed of the amphibious aircraft during taxiing; and an override switch electrically coupled to the speed sensor and configured to disable the mode selector switch. Further to this aspect the control console comprises a remote control in wireless communication therewith.

In another embodiment of the present invention there is provided a docking device for remotely docking an amphibious aircraft comprising a docking ring disposed on an outer surface of a mooring buoy; and a remote control configured to actuate at least one electromagnetic lock attached to the amphibious aircraft to lock and unlock with the docking ring.

In this embodiment the electromechanical lock may be attached to a float on the amphibious aircraft. Also in this embodiment the docking ring may be circumferentially disposed around the mooring buoy.

In yet another embodiment of the present invention, there is provided a system for maneuvering an amphibious aircraft during taxiing and docking on water, comprising a pair of pods each mounted on a float on the amphibious aircraft, each of said pods comprising a seal disposed between a bottom surface thereof and a top surface of the float and housing a thruster and a thruster deployment assembly in mechanical communication with the thruster, said thruster deployment assembly configured to actuate the thruster to taxi the amphibious plane to a mooring buoy; at least one electromechanical lock attached to one or both floats on the amphibious aircraft; a control console in operable communication with the thruster deployment assembly; a remote control in communication with the control console and configured to actuate the thrusters in a forward or a reverse direction and to actuate the electromagnetic lock to lock and unlock with a docking ring circumferentially disposed around the mooring buoy; and a power source in electrical communication with the thruster, the thruster deployment assembly and the control console. In this embodiment each thruster, thruster deployment assembly, deployment arm actuator, and control console are as described supra.

Provided herein is a taxiing system for steering an amphibious aircraft on water. Generally, the taxiing system comprises a pair of pods mounted one on each float on the amphibious aircraft, each with a thruster and thruster deployment assembly disposed or housed therein, a control console in operable communication with the thruster deployment assembly and a power source, for example, a direct current power source that delivers about 14 volts to about 35 volts, in electrical communication with the thruster, the thruster deployment assembly and the control console, for example, via. Also provided is a docking device for remote docking of the amphibious aircraft to a dock. The docking device generally consists of a docking ring secured to a mooring buoy and an electromagnetic lock attached to the float of the amphibious aircraft. In addition there is provided a system for maneuvering the amphibious aircraft during taxiing and docking that integrates the various components and structural features of both the taxiing system and the docking device that facilitates taxiing the aircraft after landing on water and securing it at the dock using the docking device.

More particularly, the pods may be mounted on the floats on the inboard side or on the outboard side. For example the pods may be mounted at the front of the step on the amphibious aircraft on the inboard side. The pods may have a seal that is placed between the pod and the float during installation to limit contaminants from entering the pod and the components contained or housed therein. Any commercially available sealing material including, but not limited to, a rubber gasket may be used for this purpose.

The pods have a suitable aerodynamic outer surface that results in minimal induced static drag to the amphibious aircraft during flight. The pods are made from any suitable material, including, but not limited to a metal, a metal alloy, a polymer, a polymer composite, a fiberglass, or a nano-composite material. A combination of these materials also be used. For example, the pods may be made from aluminum.

The thrusters are configured for left and right deployment and are independently operable. The thruster has a thruster housing that contains a drive motor or first drive motor and a thruster fan and provides structural support for the thruster. The thruster is stored within a cradle disposed in the distal end of the pod during flight.

The first drive motor is any commercially available motor. The first drive motor may be water-proofed as is known and standard in the art. It is made from corrosion resistant material and is designed for use in the presence of fresh water, sea water or saltwater. The drive motor is secured to the thruster housing using housing mounts. The thruster fan has suitable number of blades that would enable sufficient thrust to be generated to propel the aircraft without compromising aerodynamic efficiency. The thruster fan has between 4 and 8 blades.

The first drive motor is able to deliver a thrust from about 25 pounds to about 65 pounds. The thrust to be delivered is directly proportional to the weight of the amphibious aircraft. The thrust power of the first drive motor also is determined by the direction and the force of the wind and by water currents. For example, a 2.2 ton amphibious aircraft requires a first drive motor that delivers a thrust of about 25 pounds, while a 6 ton amphibious aircraft requires a first drive motor that delivers a thruster of about 35 pounds. One of skill in this art is well able to determine a minimum thrust value desired for an aircraft and select a taxiing system enabled for delivering a thrust value suitable for maneuvering this amphibious aircraft. In one aspect, the first drive motor and thruster fan are configured to deliver a thrust of at least 25 pounds. The first drive motor and thruster fan are encompassed in a thruster housing, which provides structural support for the thruster.

The thruster has a deployment arm and a detention arm each attached at a first end to the upper surface of the housing. The retention arm is laterally disposed in parallel with the deployment arm. The deployment arm and the retention arm are independently attached to the top surface of the thruster housing by any suitable fastening means including but not limited to nuts and bolts, screws, pins and rivets for permanent attachment.

The deployment arm may have a hollow tubular structure for internal routing of electrical wiring. The deployment arm may be articulated at two or more positions so that the thruster is optimally oriented parallel to the floats of the aircraft during deployment. The retention arm is articulated in two or more positions to correspond to the articulations in the deployment arm.

The deployment arm enables movement of the thruster out of the cradle into the water during taxiing and retraction of the thruster into the cradle before take-off and during flight to minimize resistance in aerodynamic environments. The retention arm guides movement of the deployment arm so that the thruster is oriented parallel to the floats during deployment, which enables proper directional application of thrust to the water while steering the aircraft in water.

The first drive motor, the thruster fan, the thruster housing, the deployment arm and the retention arm are each independently made from any suitable material or combination thereof as described for the pods. In a non-limiting example, the various components of the thruster are made from aluminum.

The thruster deployment assembly independently actuates the thrusters within the pods in a left or in a right direction. The thruster deployment assembly comprises, inter alia, a second drive motor, which as with the first drive motor may be water-proofed. The second drive motor is any commercially available motor that is controllable with a relay, for example, with a solenoid relay. The second drive motor is made from corrosion resistant material and is designed to operate in the presence of fresh water, sea water or saltwater. The second drive motor is configured to deliver an equal amount of thrust output to propel the aircraft in the forward and reverse directions varying from about 25 pounds to about 65 pounds.

In the thruster deployment assembly, the second drive motor is operably attached to a gear assembly that is mechanically configured to be in an actuating relationship with a worm gear drive swivel. The worm gear drive swivel is mechanically configured to be in an actuating relationship with a worm gear drive which in turn is in a mechanical actuating relationship with a worm gear. Also, a deployment arm drive enables movement of the deployment arm. The deployment arm drive comprises a worm gear follower that is disposed circumferentially around the worm gear. Rotation of the worm gear about its longitudinal axis, enabled by rotation of the second drive motor results in the worm gear follower travelling along the worm gear. A deployment arm actuator connects the worm gear follower to the deployment arm thereby enabling actuation of the deployment arm by activation of the second drive motor. Any type of deployment arm actuator including, but not limited to an electric linear actuator, a hydraulic actuator and a pneumatic actuator may be utilized.

The components of the thruster deployment assembly are each independently made from any suitable material or combination thereof as described for the pods and for the thrusters. In a non-limiting example, the various components of the thruster are made from aluminum.

The control console has an enclosure with a top panel on which are assembled, a mode selector switch, a pair of joysticks and a main power switch. The mode selector switch enables a user to switch the aircraft between flight mode and taxi mode. Moving the switch to taxi mode deploys the thruster outside its cradle into the water. Similarly, moving the switch to flight mode retracts the thruster into the cradle in the pod. Optionally, the control console is provided with a speed sensor configured to monitor speed of the amphibious aircraft during taxiing and to override the mode selector switch and prevent deployment of thrusters if the aircraft's speed exceeds a preset value, or to automatically retract the thrusters if the aircraft's speed exceeds a preset value. One of skill in this art is well able to determine what the safe speed limits for taxiing are and, therefore, is able to program the speed sensor to override the mode selector switch, if speeds exceed a preset value. A pair of indicator lights are in electrical communication with the mode selector switch, which helps in visual verification of flight or taxi modes and/or to generally illuminate the console for better visibility at night.

The control console has a pair of joystick controllers that operate, respectively, the first drive motors in the pods to steer the aircraft in water, similarly to steering a twin-screw boat. Any commercially available joystick controller is utilizable in manufacturing the control console. The control console is configured to be in direct electrical communication with the pods. Alternatively, the pods are controlled by the control console using a wireless means including, but not limited to, BLUETOOTH™, WiFi and other radio communication means.

The control console optionally has a remote control. The remote control has control buttons to move the aircraft in the forward or reverse directions for proper alignment with the dock before being manually secured thereto. In this embodiment, in one aspect, a cavity is formed in the enclosure of the control console on a side for removably securing the remote control within the control console. The remote control is in wireless communication with the control console. This enables use of the remote control either from within the amphibious aircraft, or from the dock in the proximity of the aircraft. Any type of wireless communication including, but not limited to, BLUETOOTH™, WiFi and other radio communication means may be used.

The taxiing system may comprise at least one lock for securing or dockeing the amphibious aircraft to a mooring buoy. The lock is an electromechanical lock that is remotely operable using the docking button on the remote control. The lock is attachable to one or both floats on the amphibious aircraft and is configured to lock or unlock with a docking ring disposed on the mooring buoy. The electromechanical lock is any type of electrically actuatable lock operated using any suitable electrical actuating cable. For example, the lock may be a relay-actuated lock with a spring-forced return for closure. The electromechanical lock may be attached at any suitable location on the aircraft's exterior that enables its removable engagement with the docking ring. In a non-limiting example, the electromechanical lock is attached on the float on a front end.

The docking device is configured to remotely dock an amphibious aircraft via one or more docking rings disposed on an outer surface of a mooring buoy, or on a dock or boat and the remote control configured to actuate at least one of the electromagnetic locks attached to the amphibious aircraft to lock and unlock with the docking ring. Alternatively, the docking ring is a circular docking ring circumferentially disposed around the mooring buoy. The docking rings engage the electromechanical lock, thereby securing the amphibious aircraft. The docking device may be used to secure the aircraft for deplaning or for storage or may secure the aircraft to a boat for towing. The remote control is operably configured for use from within the aircraft or from the dock or a boat in the proximity of the aircraft. The remote control is provided with control buttons to move the aircraft in the forward or reverse direction for proper alignment with the dock before being secured by actuating the electromechanical lock using a dock button on the remote control.

Particularly, embodiments of the present invention are better illustrated with reference to the Figure(s), however, such reference is not meant to limit the present invention in any fashion. The embodiments and variations described in detail herein are to be interpreted by the appended claims and equivalents thereof.

Figure 1A:
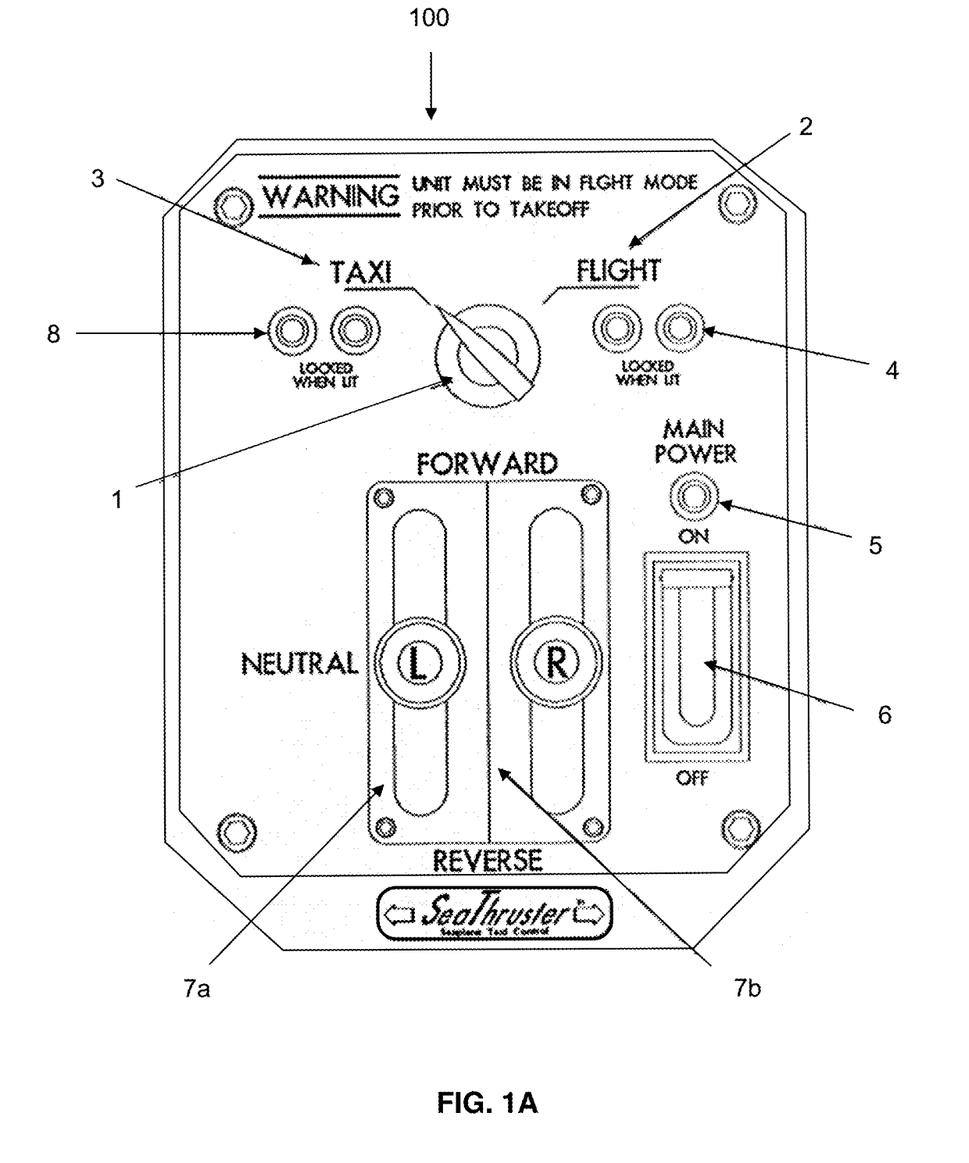
FIG. 1A shows one configuration of the control console.
Figure 1B:
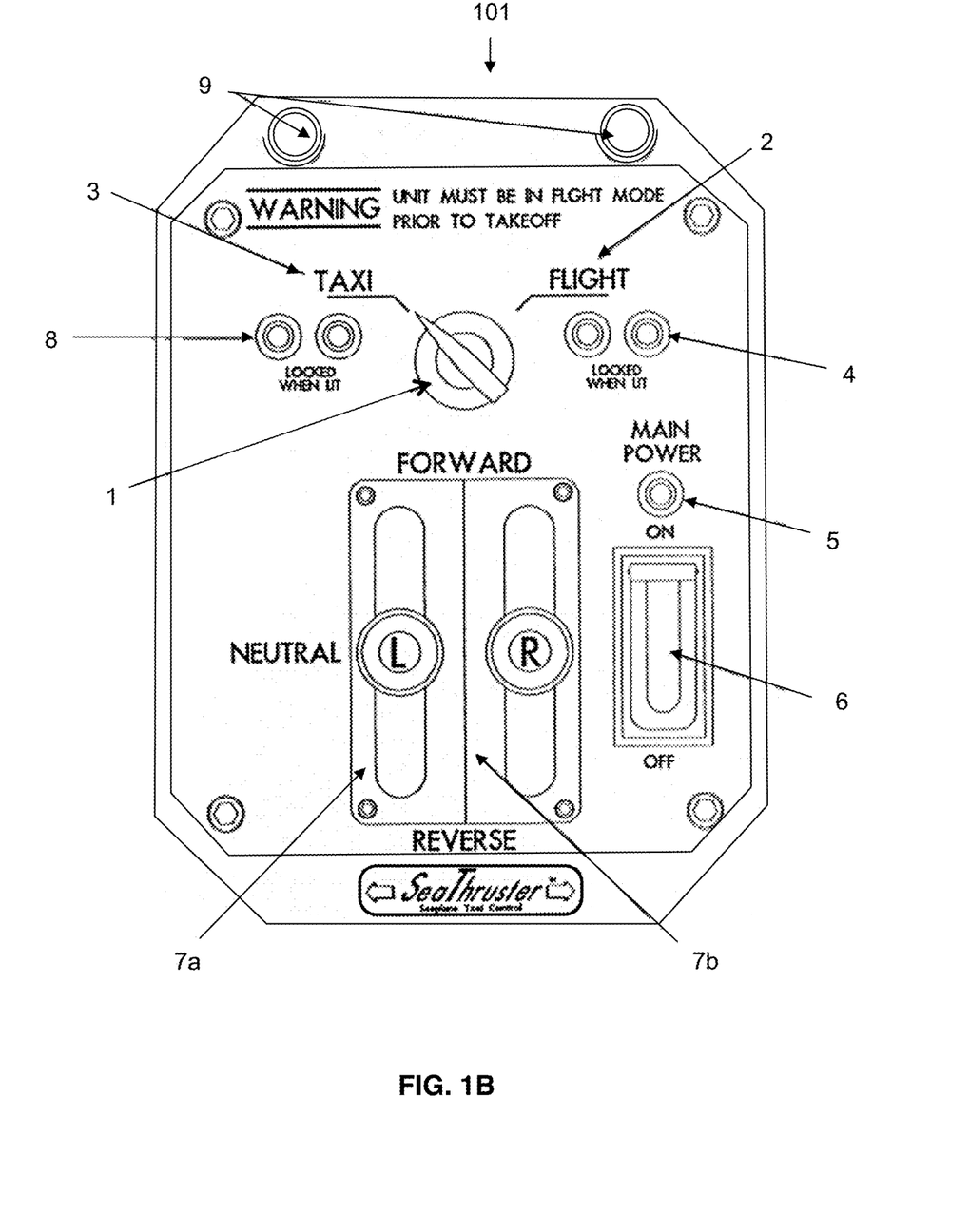
FIG. 1B shows a second configuration of the control console.
Figures 1C, 1D:
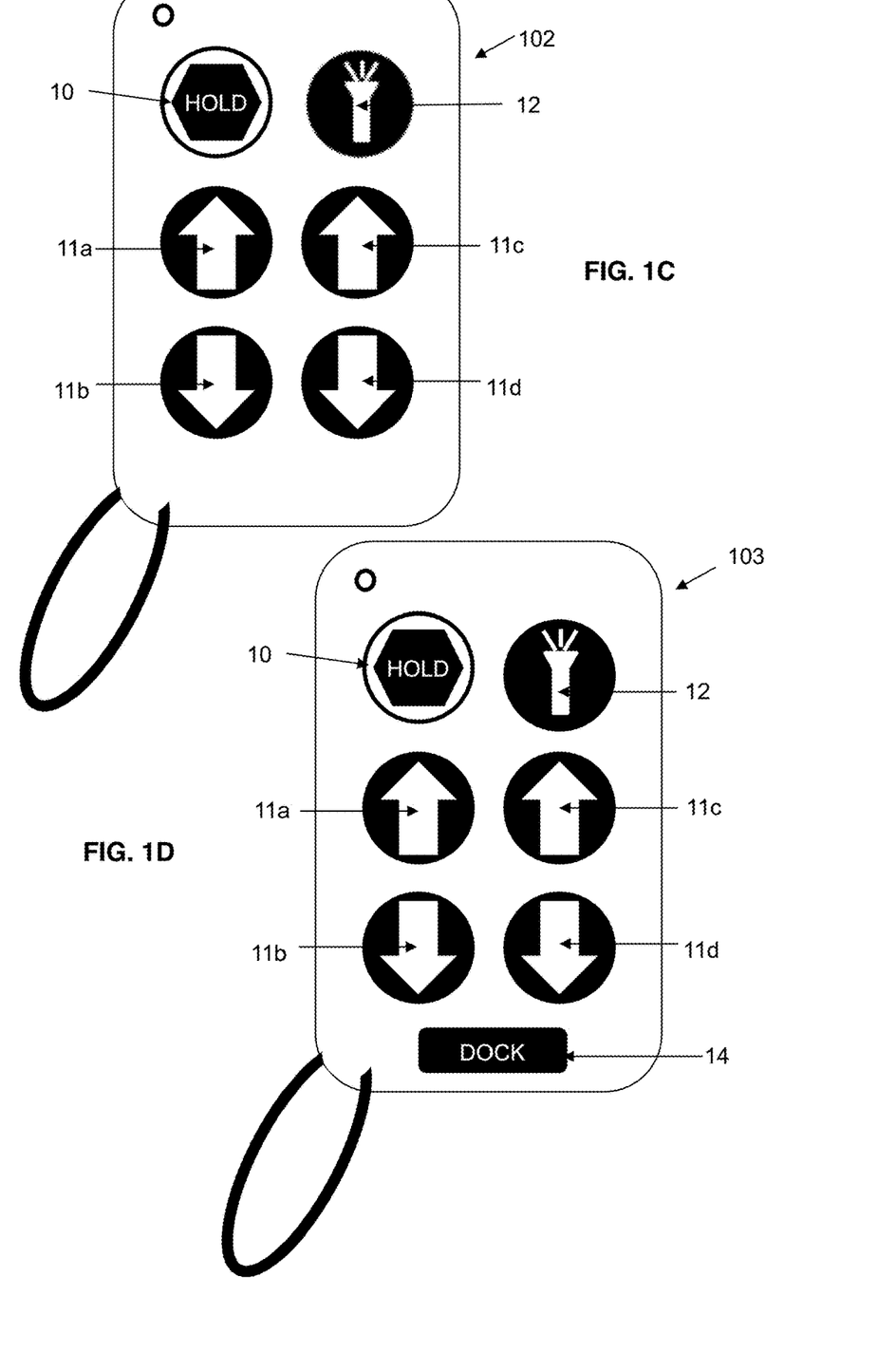
FIG. 1C shows one configuration of the remote control.
FIG. 1D shows a second configuration for the remote control.
Figure 1E:
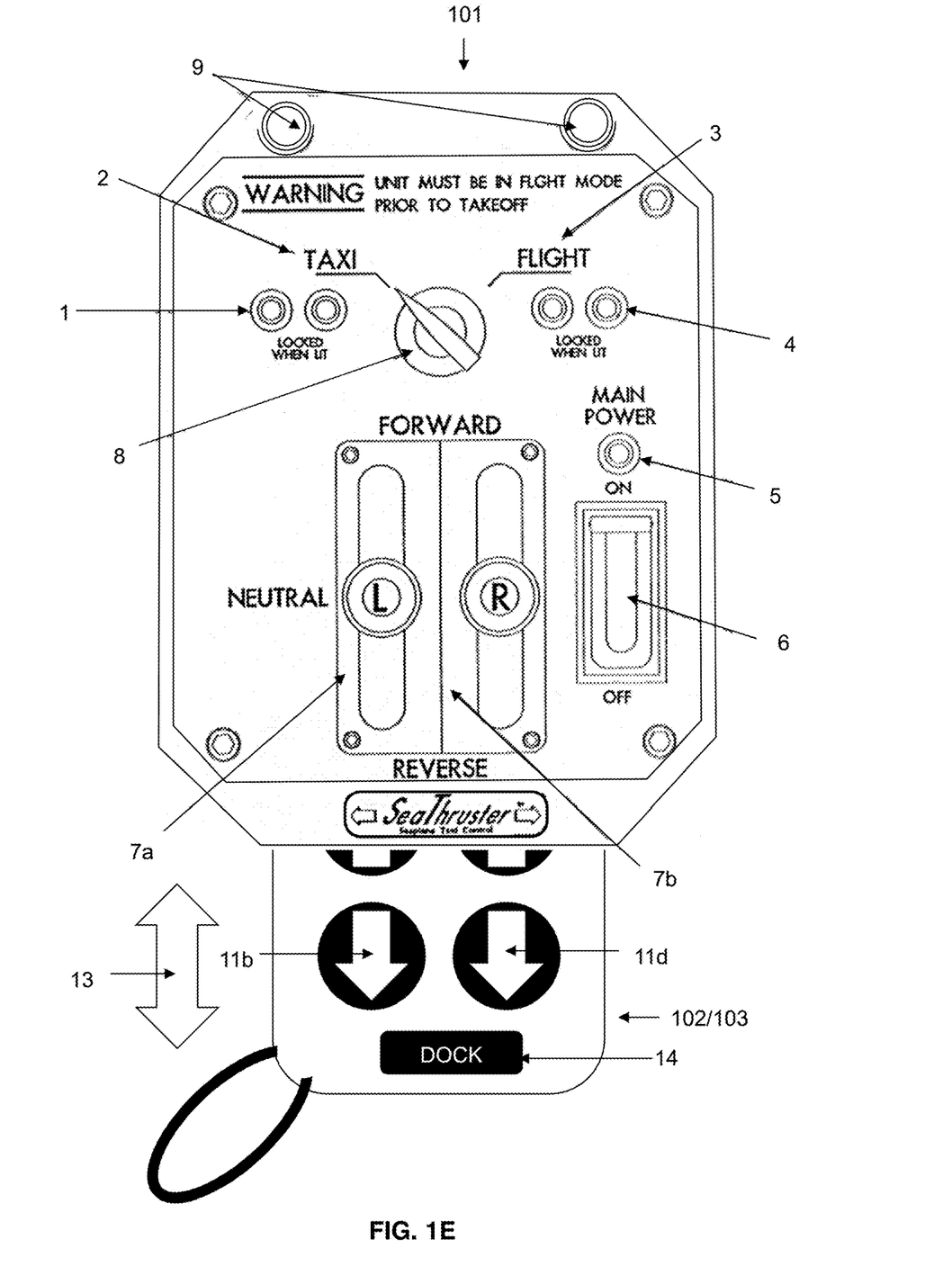
FIG. 1E shows the remote control removably secured within the control console.

FIG. 1A shows one configuration 100 of a control console for controlling the taxiing system. The control console comprises a mode selector switch 1 that enables an user to switch the aircraft from flight mode 2 to taxi mode 3 and vice versa. Lights 4 and 8 provide visual verification of mode status for the aircraft. The control console is also provided with a main power switch 6 and a power indicator light 5 to shut off power to the taxiing system. The control console is also provided with a pair of joystick controllers 7a and 7b that actuate the first drive motors in the left and right pods respectively to steer the aircraft in water, similar to steering a twin-screw boat. With continued reference to FIG. 1A, FIG. 1B shows a second configuration 101 of the control console that has all of the features described above and additionally has a pair of lights 9 at the top, on the control panel for better visibility at night. FIG. 1C shows one configuration 102 of the remote control with forward control buttons 11a, 11c and reverse control buttons 11b, 11d that operate the left (11a, 11b) and right (11c, 11d) thrusters. A hold button 10 enables a user to "nose" the aircraft up to a dock by bringing the thrusters to full power, allowing the user to exit the aircraft and secure the plane to a dock. Once the plane is secured, the hold is released by pressing the hold button in the remote control. A torch light button 12 provides visibility. With continued reference to FIG. 1C, FIG. 1D shows a second configuration 103 for the remote control that includes a dock button 14 that enables remote actuation of the solenoid actuated lock in the docking device to secure the aircraft to a mooring buoy (see FIG. 7A). With continued reference to FIGS. 1A-1D, FIG. 1E shows a remote control removably secured 13 within the control console.

Figure 2A:
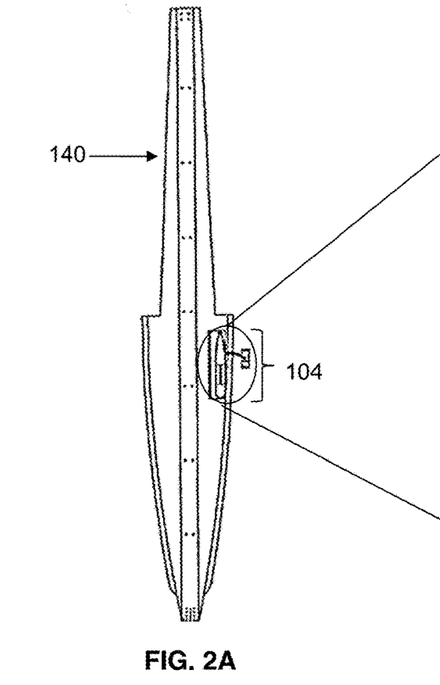
FIG. 2A shows a top view of the left float with the thruster deployed.
Figure 2B:
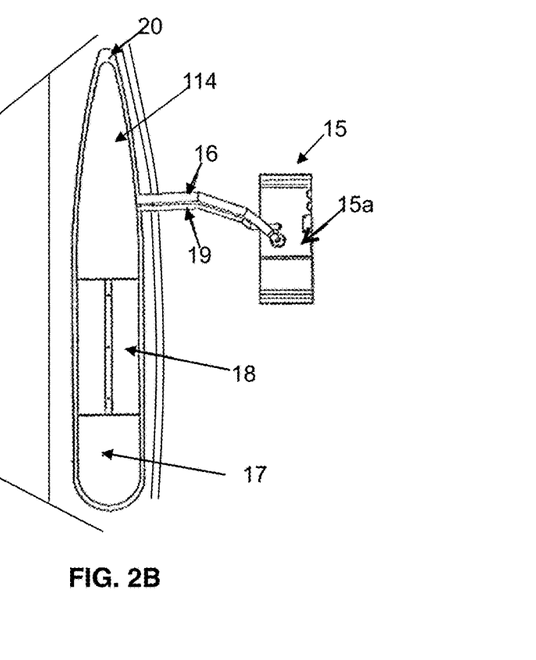
FIG. 2B is a magnified top view of the pod with deployed thruster.
Figure 2C:
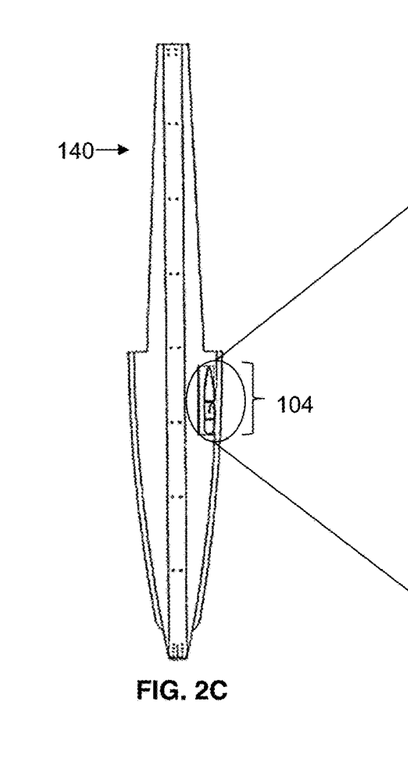
FIG. 2C shows a top view of the left float with the thruster retracted.
Figure 2D:
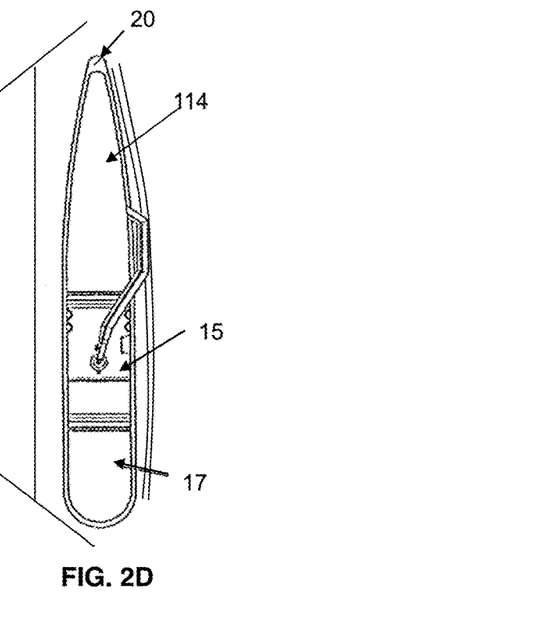
FIG. 2D is a magnified top view of the pod into which the thruster is retracted.

FIG. 2A shows a top view of the left float 140 on which is mounted the taxiing system 104 with thrusters in a deployed configuration. With continued reference to FIG. 2A, FIG. 2B is a magnified top view of the taxiing system which comprises a pod 114 with aerodynamic outer housing 17, a cradle 18 for housing the thruster 15 which is shown in a deployed configuration. The thruster has an outer housing 15a to which is operably attached a deployment arm 16 and a retention arm 19. A housing rubber gasket 20 is disposed between a bottom surface of the pod and a top surface of the float. With continued reference to FIG. 2A, FIG. 2C shows a top view of the left float 140 on which is mounted the taxiing system 104 with thrusters in a retracted configuration. With continued reference to FIGS. 2A-2C, FIG. 2D shows a magnified top view of the taxiing system with the thrusters retracted within the cradle.

Figure 3A:
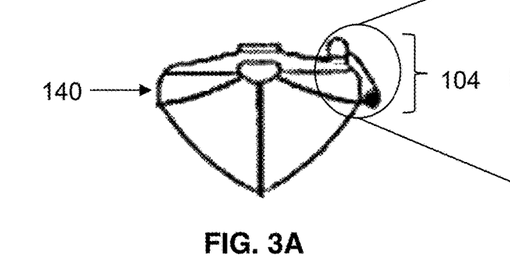
FIG. 3A shows a front view of the left float showing the thruster deployed.
Figure 3B:
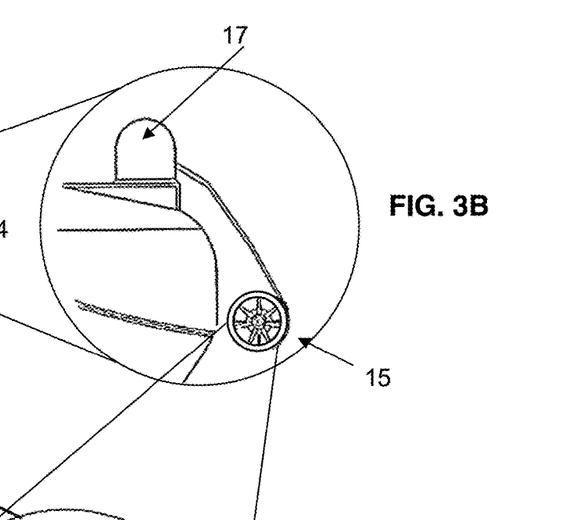
FIG. 3B is a magnified front view showing the deployed thruster.
Figure 3C:
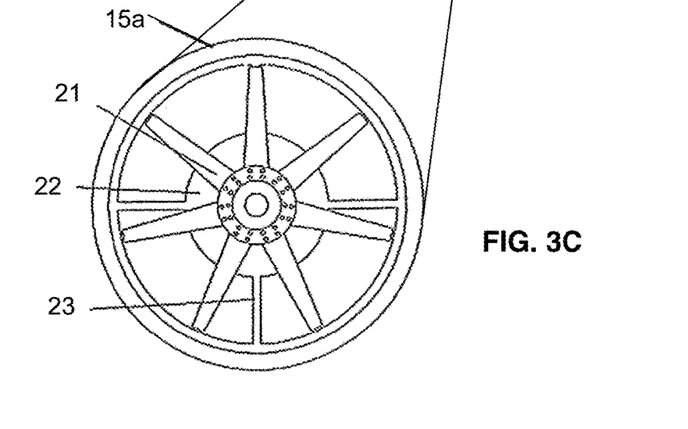
FIG. 3C is a magnified front view of the thruster in FIG. 3B showing the housing, fan and motor drive.
Figure 3D:
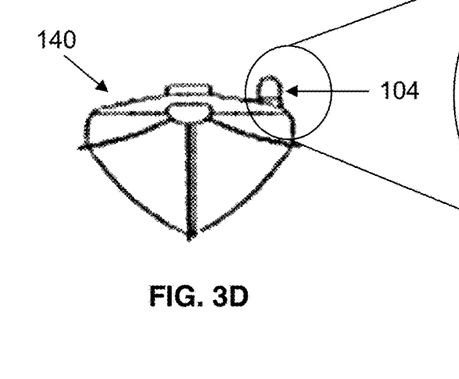
FIG. 3D shows a front view of the left float showing a pod within which is housed the thruster.
Figure 3E:
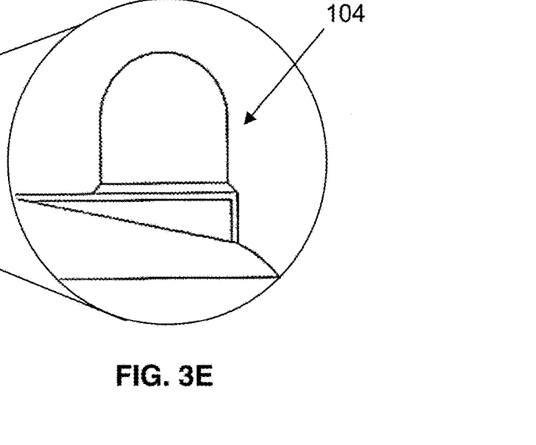
FIG. 3E is a magnified front view of the thruster.

With continued reference to FIGS. 2A-2D, FIG. 3A is a front view of the left float 140 on which is mounted the taxiing system 104 in a deployed configuration. With continued reference to FIG. 3A, FIG. 3B is a magnified front view showing the outer housing 17 of the pod and the deployed thruster 15. With continued reference to FIGS. 3A and 3B, FIG. 3C is a magnified front view of the thruster showing its outer housing 15a, thruster fan 21, first drive motor 22 attached to the housing using motor housing mounts 23. With continued reference to FIG. 3A, FIG. 3D is a front view of the left float 140 on which is mounted the taxiing system 104 in a retracted configuration. With continued reference to FIG. 3D, FIG. 3E is a magnified front view showing the taxiing system 104 in a retracted configuration.

Figure 4A:
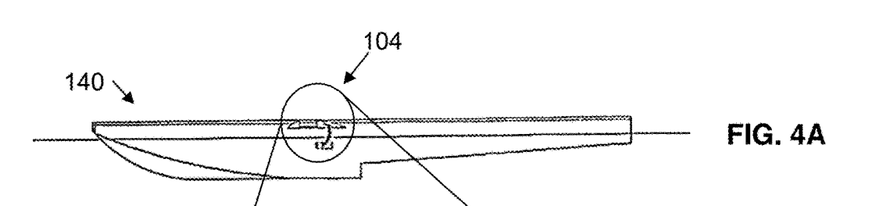
FIG. 4A shows a side view of the left float on which is mounted the taxiing system.
Figure 4B:
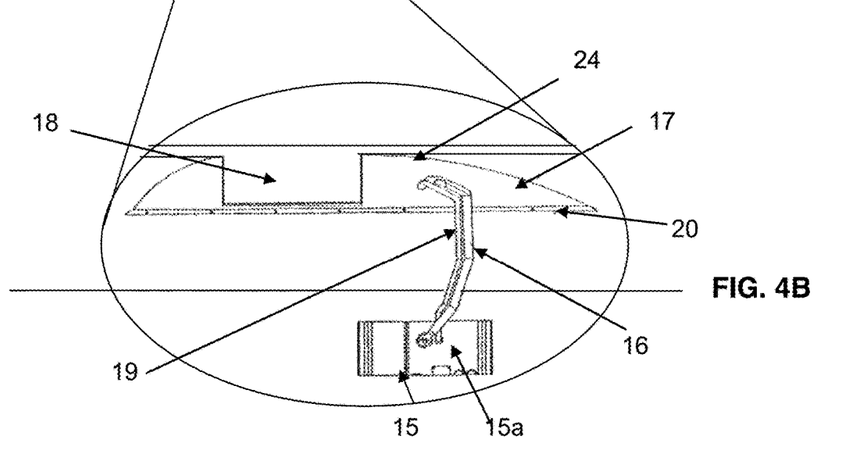
FIG. 4B is a magnified side view of the taxiing system showing the deployed thruster.
Figure 4C:
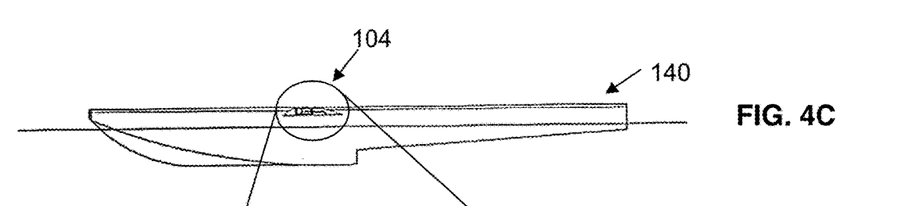
FIG. 4C shows a side view of the left float showing the taxiing system with the retracted thruster.
Figure 4D:
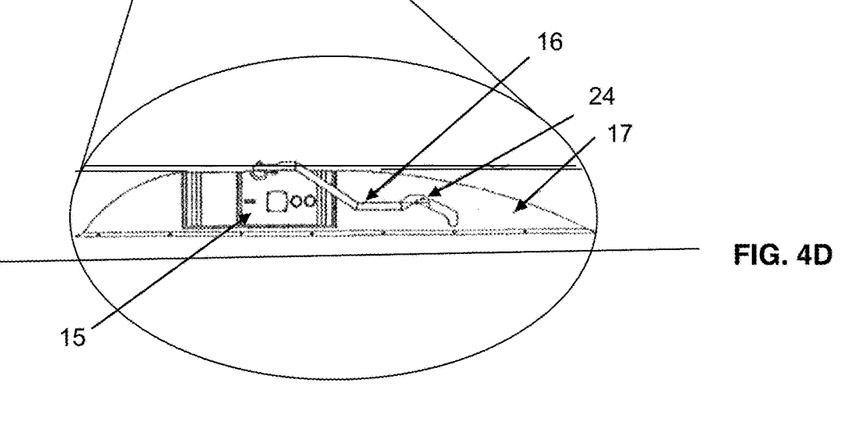
FIG. 4D is a magnified side view of the taxiing system showing the taxiing system with the retracted thruster.

With continued reference to FIGS. 2A, 2C, 3A and 3D, FIG. 4A is a side view of the left float 140 on which is mounted the taxiing system 104 in a deployed configuration. With continued reference to FIG. 4A, FIG. 4B is a magnified side view showing the taxiing system comprising pod 114 with aerodynamic outer housing 17, a cradle 18 for housing the thruster 15 which is shown in a deployed configuration. The thruster has an outer housing 15a to which is operably attached a deployment arm 16 and a retention arm 19. The deployment arm is actuated by a thruster deployment assembly located within the enclosure formed at a proximal end 24 of the pod. A seal 20, for example, a rubber gasket, is disposed between a bottom surface of the pod and a top surface of the float. With continued reference to FIGS. 2A, 2C, 3A, 3D and 4A, FIG. 4C is a side view of the left float 140 on which is mounted the taxiing system 104 in a retracted configuration. With continued reference to FIG. 4C, FIG. 4D shows a magnified side view of the taxiing system with the thrusters retracted within the cradle.

Figures 5A, 5B:
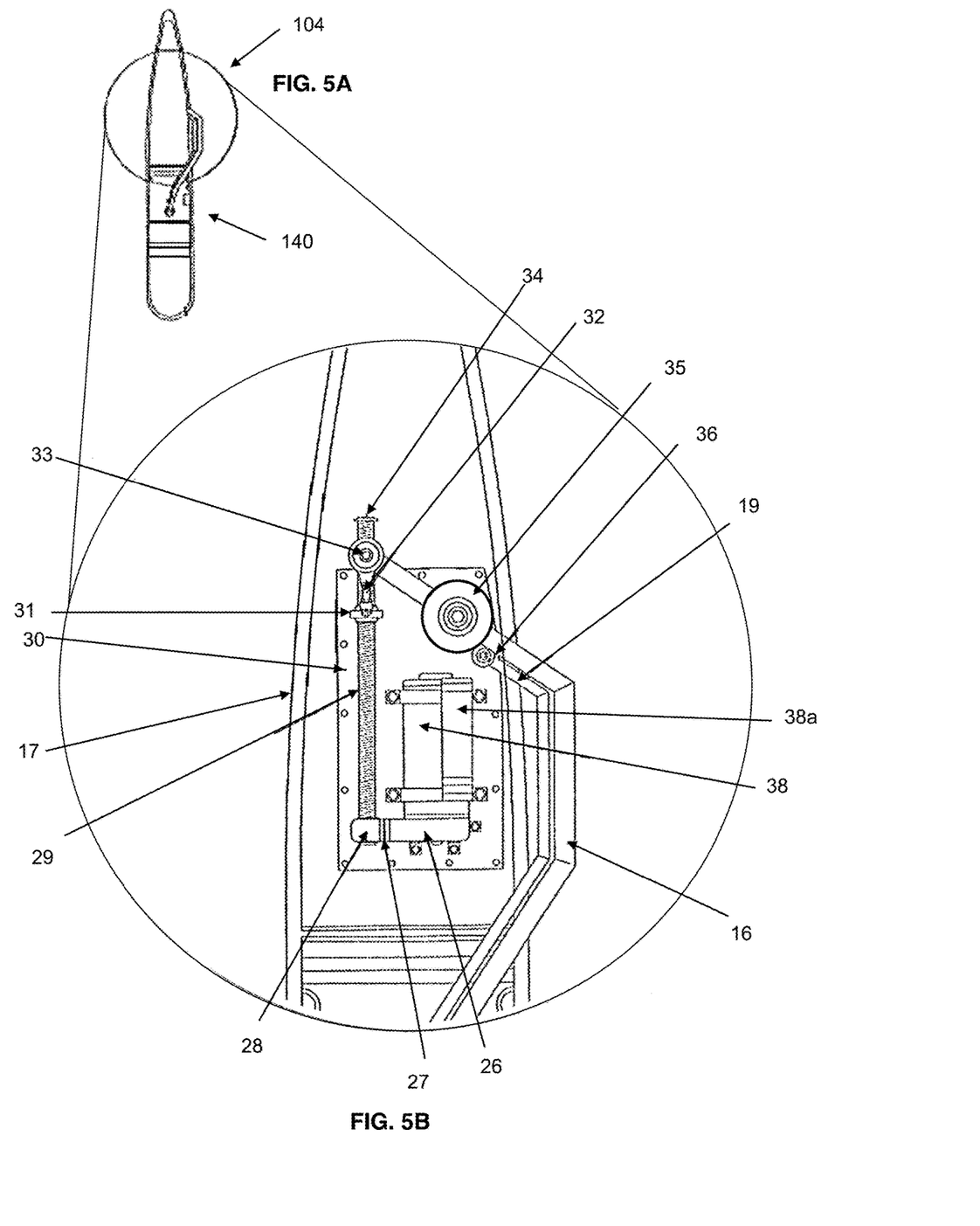
FIG. 5A is a top view of the taxiing system showing the pod into which the thruster is retracted.
FIG. 5B is a magnified longitudinal cross-sectional view of the retract and deploy drive mechanism within the pod.

FIG. 5A shows the left float 140 with the taxiing system 104 encircled. FIG. 5B is a longitudinal cross-section of the encircled portion of FIG. 5A magnified to show the proximal end of the pod with the thruster deployment assembly that controls the retract and deploy drive mechanism for the thruster. The thruster deployment assembly comprises a base late 30, on which is assembled a second drive motor 38 with a solenoid relay 38a, a gear assembly 26, a worm gear drive swivel 27, a worm gear drive 28 and a worm gear 29. A deployment arm actuator comprising a threaded adjustment rod 32, a ball mount 33 and a cam assembly 35 enables actuation of the deployment arm by operating the second motor drive. The threaded adjustment rod 32 is movably attached on one end to the worm gear follower 31 on a top surface and on a second end to the ball mount 33. The worm gear stop 34 is formed at a top end of the worm gear to prevent the ball bearing adjustable arm and the ball mount from exiting the worm gear. The cam assembly 35 is disposed in operable communication on one end with the ball mount and on a second end to the second end of the deployment arm 16. The retention arm 19 is operably attached to the base plate with a retention arm mount 36.

Figure 6A:
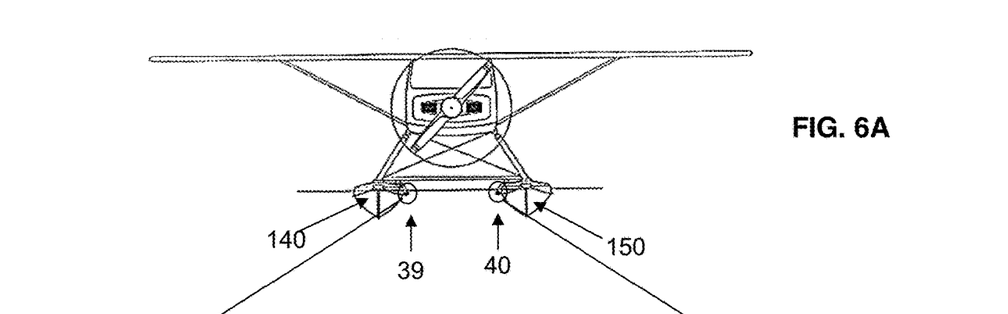
FIG. 6A shows a front view of the aircraft showing the location of the taxiing system.

FIG. 6A is a front view of an amphibious aircraft showing placement location 39, 40 of the taxiing system on the inboard side of left float 140 and right float 150 respectively.

Figure 6B:
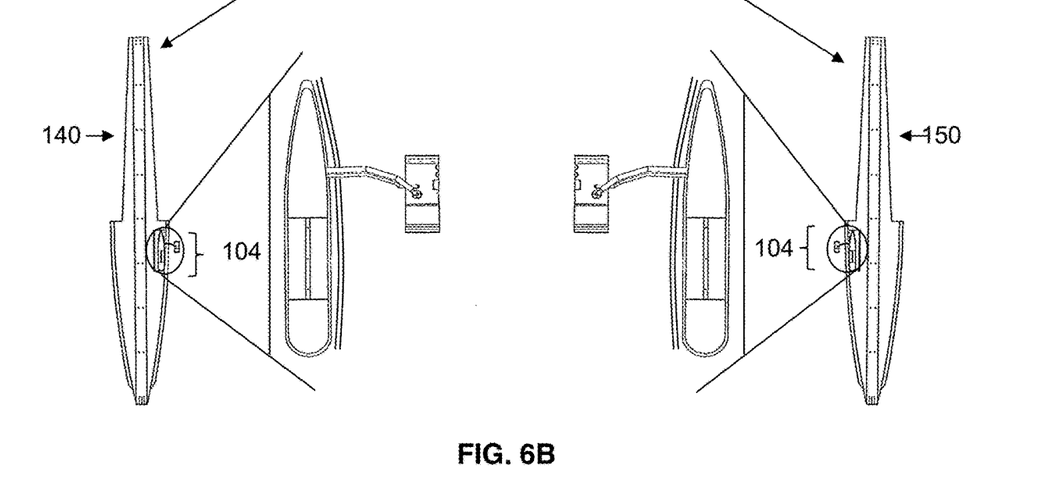
FIG. 6B is a top view showing a left taxiing system with thruster and a right taxiing system with thruster positioned for right deployment.
Figure 6C:
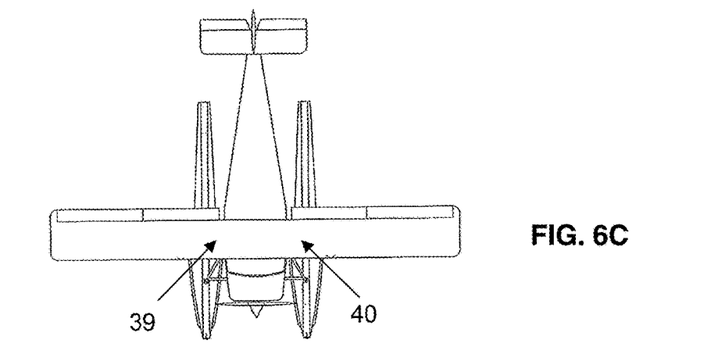
FIG. 6C is a top view of the aircraft showing the relative position of the taxiing system on the floats.

With continued reference to FIG. 6A, FIG. 6B is a top view showing symmetrical orientation of the deployed left and right thrusters 104 at location 39 and 40 respectively. With continued reference to FIG. 6A, FIG. 6C is a top view of the amphibious aircraft showing location 39, 40 of the taxiing system in relation to the wings.

Figure 7A:
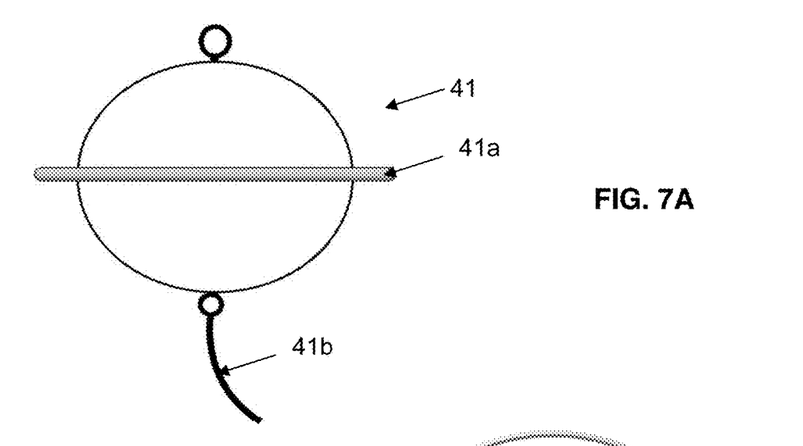
FIG. 7A is a side view of a mooring buoy with a mooring ring disposed circumferentially.
Figure 7B:
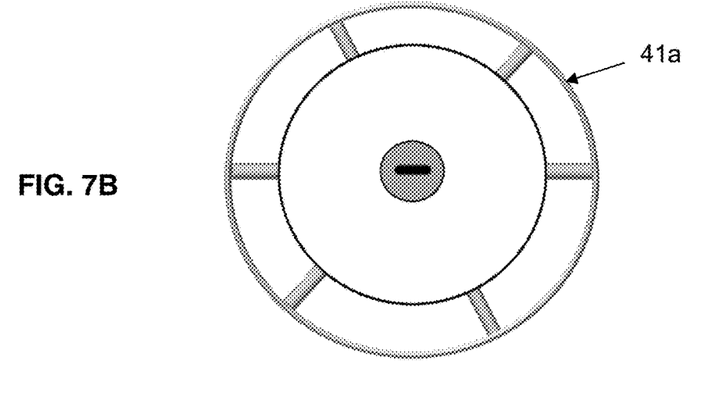
FIG. 7B is a top view of a mooring buoy showing the mooring ring disposed circumferentially.
Figure 7C:
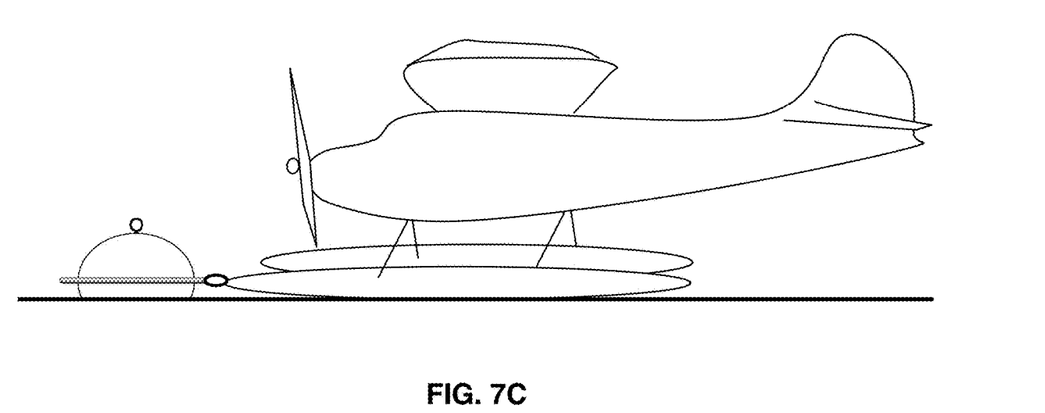
FIG. 7C a side view of a mooring buoy with a mooring ring to which is removably docked an amphibious aircraft.

FIG. 7A is a side view of a spherical mooring buoy 41 with a mooring ring 41a disposed circumferentially and a lead 41b for securing the buoy to the dock. With continued reference to FIG. 7A, FIG. 7B is a top view of the mooring buoy showing the mooring ring disposed circumferentially. With continued reference to FIGS. 7A and 7B, FIG. 7C is a side view of a mooring buoy with a mooring ring to which is removably docked an amphibious aircraft.

Figure 8A:
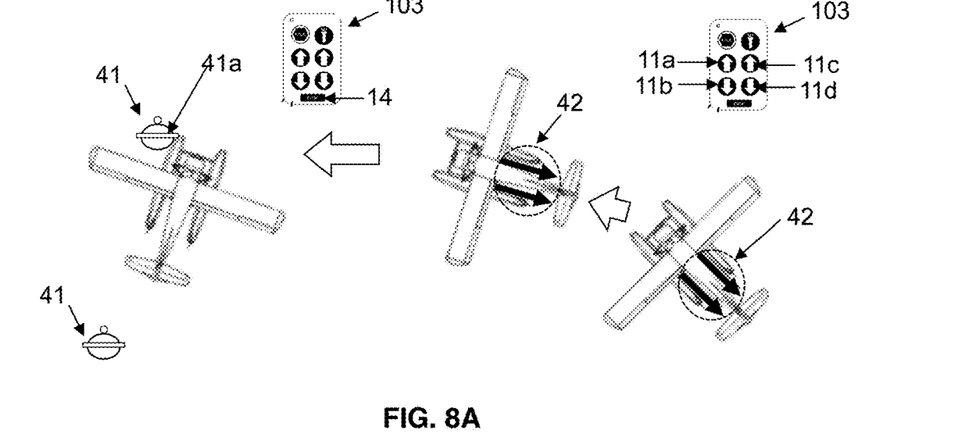
FIG. 8A illustrates using a system comprising the taxiing system and the docking device to secure the aircraft to a mooring buoy.
Figure 8B:
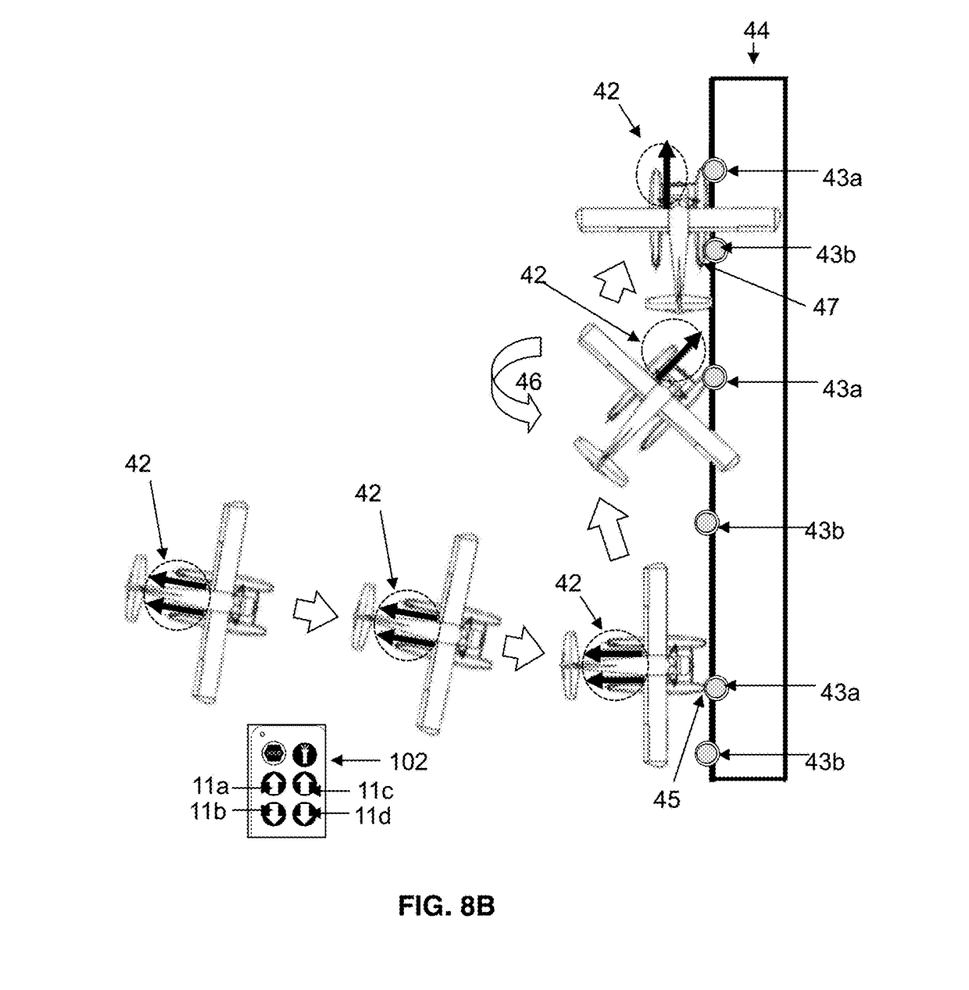
FIG. 8B illustrates using the taxiing system to steer the aircraft before manually securing it to a dock.

FIG. 8A illustrates how an aircraft is steered on water to approach a mooring buoy 41 by actuating 42 the thrusters using buttons 11a, 11b, 11c and 11d on remote control 103. Pressing the dock button 14 on the remote control actuates the solenoid actuated lock whereby the aircraft is secured to the mooring ring 41a. With continued reference to FIG. 8A, FIG. 8B illustrates how an aircraft is steered on water towards dock 44 by actuating 42 both thrusters using buttons 11a, 11b, 11c and 11d in the remote control 102, manually tying the bow line 45 of the aircraft to ring 43a attached to the dock, actuating 42 left thrusters to swing 46 the aircraft before manually tying the stern line 47 to ring 43b.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention.

What is claimed is:

1. A taxiing system for steering an amphibious aircraft on a body of water comprising:
   a pair of pods each having a proximal end and a distal end and each mounted on a float on the amphibious aircraft, each of said pods comprising:
      an enclosure formed within the pod at the proximal end;
      a cradle formed within the pod at the distal end;
      a thruster housed within the cradle and removably deployable therefrom during taxiing;
      a thruster deployment assembly housed within the enclosure and in mechanical communication with the thruster;
   a control console in operable communication with the thruster deployment assembly; and
   a power source in electrical communication with the thruster, the thruster deployment assembly and the control console.

2. The taxiing system of claim 1, further comprising a seal disposed on the pod between a bottom surface thereof and a top surface of the float.

3. The taxiing system of claim 1, further comprising at least one electromechanical lock attached to one or both floats on the amphibious aircraft configured to lock and to unlock with a docking ring.

4. The taxiing system of claim 1, wherein each thruster is independently operable.

5. The taxiing system of claim 1, wherein each thruster comprises:
   a water-proofed first drive motor with a thruster fan operably attached thereto;
   a thruster housing containing the first drive motor and the thruster fan therein;
   a deployment arm comprising a first deployment end and a second deployment end, said first deployment end movably attached to the thruster housing on an upper surface thereof; and
   a retention arm comprising a first retention end and a second retention end disposed in a parallel relationship with the deployment arm, said first retention end movably attached to an upper surface of the thruster housing.

6. The taxiing system of claim 5, wherein the deployment arm and the retention arm are each articulated in at least two locations thereon.

7. The taxiing system of claim 5, wherein the first drive motor is configured to deliver a thrust of about 25 pounds to about 65 pounds.

8. The taxiing system of claim 1, wherein the thruster deployment assembly is configured to independently actuate the thruster in each of the pair of pods in a left direction or in a right direction.

9. The taxiing system of claim 5, wherein the thruster deployment assembly comprises:
   a base plate;
   a water-proof second drive motor attached to the base plate;
   a relay in electrical communication with the second drive motor;
   a gear assembly operably attached to the second drive motor;
   a worm gear drive swivel with a first swivel end and a second swivel end, said first swivel end in an actuating relationship with the gear assembly;
   a worm gear drive with a first drive end and a second drive end;
   a worm gear in an actuating relationship with the first drive end;
   a worm gear follower disposed circumferentially around the worm gear and configured to travel along the worm gear;
   a deployment arm actuator attached to the worm gear follower and configured to actuate the deployment arm; and
   a retention arm mount attached to the base plate and in mechanical communication with the second retention end of the retention arm.

10. The taxiing system of claim 9, wherein the deployment arm actuator comprises:
    a threaded adjustment rod with a proximal end and a distal end, said proximal end attached to a top surface of the worm gear follower;
    a ball mount attached to the distal end of the threaded adjustment rod and to the second deployment end of the deployment arm; and
    a cam assembly comprising a channel disposed diagonally thereacross, said channel configured to receive the deployment arm therein.

11. The taxiing system of claim 9, wherein the second drive motor is configured to deliver a thrust rate from about 25 pounds to about 65 pounds.

12. The taxiing system of claim 1, wherein the control console comprises:

a mode selector switch to switch the aircraft between flight mode and taxi mode;

a pair of joysticks each configured to steer the amphibious aircraft when in taxi mode;

a speed sensor configured to monitor speed of the amphibious aircraft during taxiing; and an override switch electrically coupled to the speed sensor and configured to disable the mode selector switch.

13. The taxiing system of claim 1, wherein the control console further comprises a remote control in wireless communication therewith.

14. The taxiing system of claim 1, wherein the pods comprise an aerodynamic outer surface.

15. The taxiing system of claim 1, wherein each pod is mounted on the float on an inboard side at a front end thereof.

16. A system for maneuvering an amphibious aircraft during taxiing and docking on water, comprising:

a pair of pods each mounted on a float on the amphibious aircraft, each of said pods comprising a seal disposed between a bottom surface thereof and a top surface of the float and housing a thruster and a thruster deployment assembly in mechanical communication with the thruster, said thruster deployment assembly configured to actuate the thruster to taxi the amphibious plane to a mooring buoy;

at least one electromechanical lock attached to one or both floats on the amphibious aircraft;

a control console in operable communication with the thruster deployment assembly;

a remote control in communication with the control console and configured to actuate the thrusters in a forward or a reverse direction and to actuate the electromagnetic lock to lock and unlock with a docking ring circumferentially disposed around the mooring buoy; and a power source in electrical communication with the thruster, the thruster deployment assembly and the control console.

17. The system of claim 16, wherein each thruster comprises:

a water-proofed first drive motor with a thruster fan operably attached thereto;

a thruster housing containing the first drive motor and the thruster fan therein;

a deployment arm comprising a first deployment end and a second deployment end, said first deployment end movably attached to the thruster housing on an upper surface thereof; and a retention arm comprising a first retention end and a second retention end disposed in a parallel relationship with the deployment arm, said first retention end movably attached to an upper surface of the thruster housing.

18. The taxiing system of claim 16, wherein the thruster deployment assembly comprises:

a base plate;

a water-proof second drive motor attached to the base plate;

a relay in electrical communication with the second drive motor;

a gear assembly operably attached to the second drive motor;

a worm gear drive swivel with a first swivel end and a second swivel end, said first swivel end in an actuating relationship with the gear assembly;

a worm gear drive with a first drive end and a second drive end;

a worm gear in an actuating relationship with the first drive end;

a worm gear follower disposed circumferentially around the worm gear and configured to travel along the worm gear;

a deployment arm actuator attached to the worm gear follower and configured to actuate the deployment arm; and a retention arm mount attached to the base plate and in mechanical communication with the second retention end of the retention arm.

19. The system of claim 18, wherein the deployment arm actuator comprises:

a threaded adjustment rod with a proximal end and a distal end, said proximal end attached to a top surface of the worm gear follower;

a ball mount attached to the distal end of the threaded adjustment rod and to the second deployment end of the deployment arm; and a cam assembly comprising a channel disposed diagonally thereacross, said channel configured to receive the deployment arm therein.

20. The system of claim 16, wherein the control console comprises:

a mode selector switch to switch the aircraft between flight mode and taxi mode;

a pair of joysticks each configured to steer the amphibious aircraft when in taxi mode;

a speed sensor configured to monitor speed of the amphibious aircraft during taxiing; and an override switch electrically coupled to the speed sensor and configured to disable the mode selector switch.

* * * * *